United States Patent [19]

Winstone

[11] Patent Number: 5,478,480

[45] Date of Patent: Dec. 26, 1995

[54] METHOD AND APPARATUS FOR SEPARATING FLUIDS USING A VESSEL WITH A CONTROLLABLE OUTLET

[75] Inventor: Ronald A. H. Winstone, Auckland, New Zealand

[73] Assignee: Kenron Trading Limited, Auckland, New Zealand

[21] Appl. No.: 125,362

[22] Filed: Sep. 21, 1993

[30] Foreign Application Priority Data

Sep. 21, 1992 [NZ] New Zealand .......................... 244425

[51] Int. Cl.⁶ .................................................. B01D 17/02
[52] U.S. Cl. ........................ 210/747; 210/242.3; 210/776; 210/923
[58] Field of Search ................... 210/170, 242.1, 210/242.3, 521, 747, 776, 800, 923

[56] References Cited

U.S. PATENT DOCUMENTS

| | | | |
|---|---|---|---|
| 3,508,652 | 4/1970 | Woolley | 210/242.3 |
| 3,782,553 | 1/1974 | Brekke | 210/242.3 |
| 5,073,261 | 12/1991 | Conradi et al. | 210/923 |
| 5,080,783 | 1/1992 | Brown | 210/923 |

OTHER PUBLICATIONS

Pollutank Reservoir Flottant Floating Tank, Sillinger, Paris, France (2 pages), undated.
Buoyancy tank for hydrocarbons spread at sea, Solas (1 page), undated.
Le Savoir–Faire, Zeppelin (1 page), undated.
Catalogue–Oct. 1992, Reservoir "" Flottant (1 page).

*Primary Examiner*—Joseph W. Drodge
*Attorney, Agent, or Firm*—Christie, Parker & Hale

[57] ABSTRACT

This invention relates to methods and apparatus for handling fluids and fluid mixtures such as those which result in pollution spills of substantially non-water soluble substances on a waterway. The invention includes use of a vessel supportable on the body of water and which can be taken to the pollution site. The vessel has a hold into which the spillage can be pumped and the method and apparatus enables the separation of entrained and mixed water with the pollutant to enable concentration of the pollutant in the hold. Concentration is achieved by providing the hold with a controlled outlet which can communicate from a lower portion of the hold to the supporting body of water. As the pollutant separates from the water, the water can be decanted off from beneath, thus concentrating the pollutant in the hold. Decanting is achieved either by a pure gravitational relationship between the levels of the mixture in the hold and the surrounding supporting water body or alternatively, by deformation of at least part of the hold during movement of the vessel reducing the volume of the hold to raise the mixture level in the hold for decanting of the water therefrom.

12 Claims, 2 Drawing Sheets

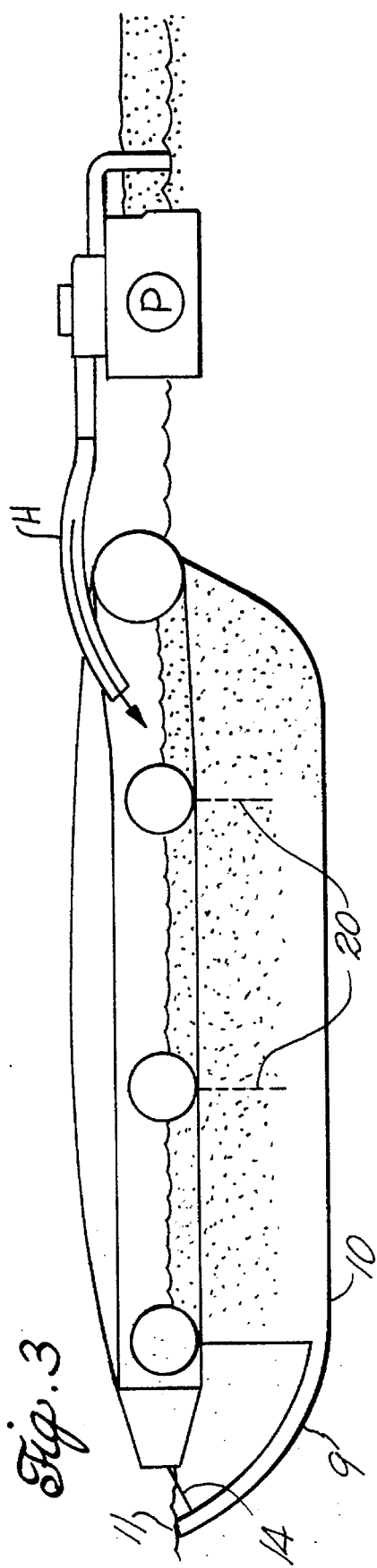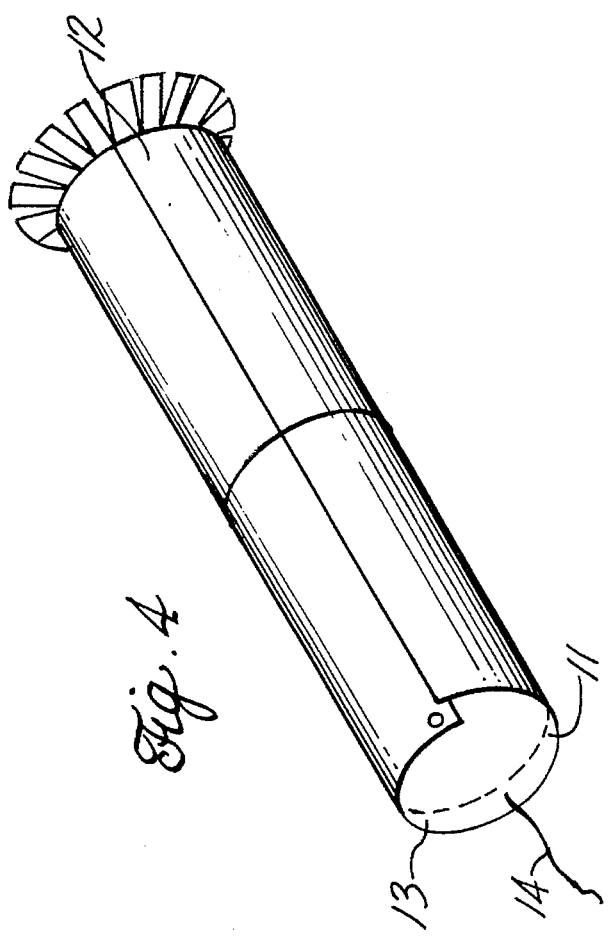

METHOD AND APPARATUS FOR SEPARATING FLUIDS USING A VESSEL WITH A CONTROLLABLE OUTLET

FIELD OF THE INVENTION

This invention relates to methods and apparatus for handling fluids and fluid mixtures. The invention is particularly relevant to methods and apparatus for dealing with pollution spills, particularly contaminant or pollution spills on waterways involving oil or similar substantially non-water soluble materials.

BACKGROUND OF THE INVENTION

Methods and apparatus for dealing with pollution of waterways have historically experienced difficulty in the effective separation and subsequent holding, transportation and handling of the pollutant and/or contaminated material.

Some reasonably significant advances in the methods of disposal of pollutants once recovered have been made, however, a major difficulty remains in the actual separation of the pollutants (for example oils or other substantially non-soluble materials) from water, particularly where recovery is undertaken by way of pumping or other movement of the water/pollutant mix, or otherwise where a temporary emulsion is often created by agitation and where substantial quantities of unwanted water are also entrained in the pollutant recovery system. The mix volume often creates difficulty for transportation handling and disposal downstream.

Where the pollutant or contaminant is spread thinly over a wide area of waterway the actual volume of fluid (including both pollutant and water) required to be gathered in, contained, transported and subsequently separated and disposed of can be a ratio in the order of 1 to 100 of pollutant to water.

This adverse ratio can lead to high cost in the overall recovery process and therefore reduces the opportunity for pollution control often to a level where economic consideration take prime consideration over ecological ones.

Containment vessels or barges have been utilised to receive a pollutant and a mixture of water and pollutant. Generally, the discharge of the pollutant and any water therefrom has been somewhat haphazard and difficult, particularly when a cargo level is substantially low, such as when the vessel is decommissioned.

Attempts have been made to provide for the convenient lifting and subsequent drainage of vessels or barges after use, however in view of the weight of the barges or vessels, with even relatively small amounts of cargo remaining in a cargo area (and the need to avoid spillage of potentially pollutant material) drainage has been difficult to achieve without the need to resort to extremely robust vessel or barge construction, heavy duty cranes and the like.

It is therefore an object of this invention to overcome the above-mentioned problems or at least provide the public with a useful choice.

SUMMARY OF THE INVENTION

According to one aspect of this invention there is provided a method of separating from water an at least partially non-water soluble substance having a density less than water, comprising the steps of forming a containment means and supporting said containment means on a body of water, providing an inlet for said containment means, providing a controlled outlet for said containment means in communication with a lower portion of said containment means, said controlled outlet including an elongate hollow member positioned on an exterior of said containment means and exiting therefrom outwardly, the elongate hollow member being mounted in a substantially flexible manner so that an outlet port thereof is moveable relative to the containment means between a position substantially level with a lower portion of said containment means and a position substantially level with a maximum-load level of said containment means, introducing a mixture of water and said substance into said containment means via said inlet portion and holding said mixture in said containment means for sufficient time so at least a part of said substance separates from said water, and controlling said outlet by movement of said outlet port between said levels to achieve a controlled outflow of water from the lower portion of said containment means, to concentrate said substance in said containment means.

According to a further aspect of this invention there is provided a vessel including a containment means for the separation of water and at least partially non-water soluble substances less dense than water, said containment means supportable by a body of water and having an inlet, said containment means having a controllable outlet positioned substantially remote from said inlet portion, to enable controlled communication of at least a lower portion of said containment means with the supporting body of water, said outlet including an elongate hollow member positioned on an exterior of said containment means and exiting therefrom outwardly, said elongate hollow member being mounted in a substantially flexible manner so that an outlet port thereof is moveable relative to said containment means between a position substantially level with the lower portion of the containment means and a position substantially level with a maximum-load level of said containment.

BRIEF DESCRIPTION OF THE DRAWINGS

FIG. 3 is a substantially diagrammatic cross-sectional side view of the apparatus of FIG. 1, showing the apparatus in use according to the method of the invention; and FIG. 4 is an exploded view of a decanting tube of the invention.

DETAILED DESCRIPTION OF THE PREFERRED EMBODIMENT

The preferred form of the invention will now be described. While reference is made to particular materials and construction techniques, it is to be appreciated that these are only by way of example and alternative arrangements and material suited to the concepts and arrangements of the invention can be incorporated without departing from the invention.

The preferred form of the invention provides a method and apparatus for dealing with, for example, an oil spilling a waterway and the convenient and efficient handling of that spill on site on the waterway utilising preferably an inflatable barge having a containment means such as a flexible cargo hold into which a mixture of pollutant and water can be pumped to gather in and concentrate the pollutant for subsequent transportation to, for example, a shorebound recovery/disposal plant.

The method and apparatus of the invention offers and enables a substantial improvement in the efficiency of the gathering in, concentration and transportation aspects of such an operation. These features are particularly relevant where the spillage occurs in an area substantially remote from a facility for dealing with the recovered pollutant material.

The invention also enables a reduction in the number of trips between the spillage site and the recovery/disposal facility with large volumes of cargo but a relatively low ratio of water to pollutants as a result of the collection methods employed. It is known that surface skimmer devices, pumps and the like commonly used to recover pollutants inevitably entrain relatively high quantities of water with the pollutant.

While in the preferred form the invention is described with reference to a containment means such as a vessel or barge of an inflatable nature, the invention is not limited thereto and the apparatus and method of this invention has application to any form of containment means for water and substantially non-water soluble substances of a lower density than water.

Figure 1:
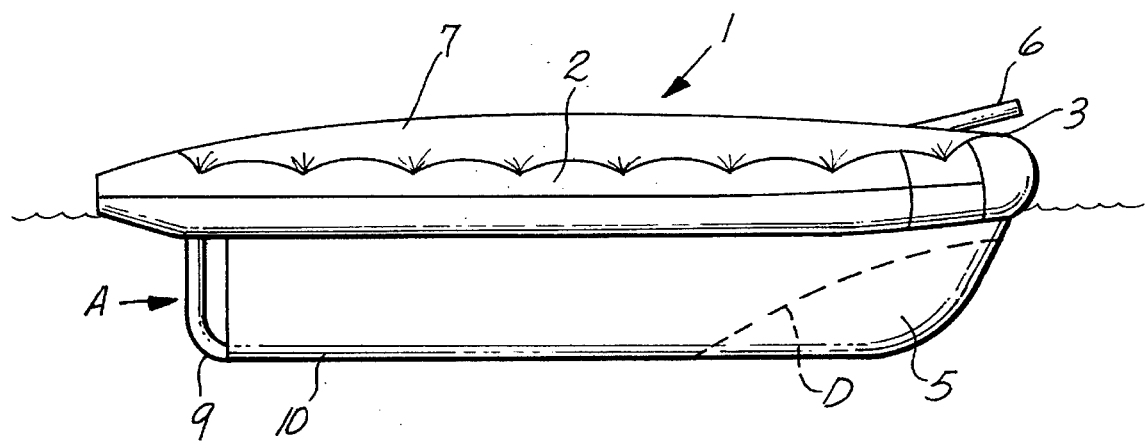
FIG. 1 is a side elevation of a typical vessel for use according to the method and incorporating the apparatus of the invention.
Figure 2:
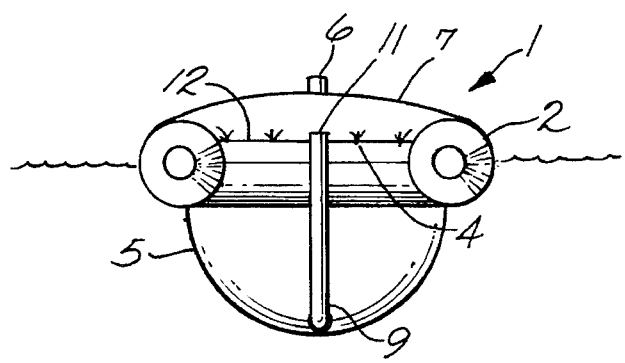
FIG. 2 is a stern view in the direction of arrow A of the vessel of FIG. 1.

Referring to the drawings and in particular FIGS. 1 and 2, the vessel as generally indicated by arrow 1 is preferably provided as an inflatable barge having perimeter tubes 2 as a floatation collar and preferably arranged into a substantially U-shaped arrangement to define a rounded bow portion 3. At least one and preferably a plurality of thwart members 4 are arranged to span transversely of the vessel 1 to assist in shape retainment of the perimeter tube 2 acting as the floatation collar for the vessel 1 as a whole.

The vessel 1 defines a containment means, cargo area or hold 5 which in the preferred form is provided as a substantially large flexible bag in similar material to that of which the inflatable portions of the perimeter tube 2 are formed.

Preferably woven polyester, rubberised or plasticised sheet fabric material is used to crate the containment means 5 preferably as a cargo area, hold or tank which is in the preferred form substantially open to the top of the vessel 1, but having a removable cover means 7. This of course is in no way essential to the invention.

A hose or other fluid inlet means 6 is provided to receive an outlet pipe from a skimmer pump P and the like (see FIG. 3), to facilitate filling of the cargo hold or containment means 5 while the vessel 1 is moored and the cover is in place, adjacent pump P.

Cover means 7 is provided to assist in retaining a fluid cargo therewithin during transportation and to avoid unnecessary ingress of spray and waves while vessel 1 is underway in a loaded condition.

Cargo area 5 also includes a controlled outlet means 9 which, in the preferred form of the invention, has a substantially flexible tubular member formed preferably from sheet material similar to the material forming the cargo area 5, preferably substantially cylindrically as shown by FIG. 4.

Outlet means 9 is provided as a "decanting tube" and preferably emanates from communication with a lower portion 10 of the hold.

In the preferred form of the invention, and with reference to FIG. 4, the outlet means 9 or decanting tube is preferably provided as a substantially elongate arrangement having an inner end 12 thereof flared into a series of flanges to engage in a substantially robust manner with an aperture provided in the lower after end of the containment means 5 or cargo bag.

An outer end portion 11 of the outlet 9 is provided with a sleeve portion 13 thereabout which can accommodate a rope or other tie-off means for the purposes of substantially closing the outer end portion 11 and restricting the flow of fluid therethrough. Further, a line 14 is preferably provided for controlling the positioning of the outlet 9 substantially in relation to the after end of the vessel 1.

In a non-operative position the outlet 9 is preferably secured, for example by lines and the like with its upper end 11 adjacent a transom or after thwart member 4 of the vessel 1 such that the outer end 11 is positioned above the waterline and a cargo fluid level is within the containment means 5. It will be appreciated that in this disposition any flow of fluid through the decanting means 9 and thus from the containment means 5 is restricted.

Referring specifically to FIG. 3, it will be seen that the apparatus 1 is shown in substantially cut away form with the pump P substantially adjacent.

The pump P plant usually incorporates an outlet hose H which carries a flow of fluid; being a mixture of pollutant, such as oil and water in a substantially semi-emulsified or otherwise mixed state. Hose H is preferably inserted within the sleeve 6 and the fluid mixture is passed into the containment means 5 slowly filling said containment means 5 until such time as said containment means 5 adopts a shape substantially as shown in FIGS. 1 and 3.

It will be appreciated that once the containment means 5 or hold had adopted its "full" shape continued filling of the hold 5 will tend to cause the vessel 1 itself to displace a greater volume of water, the buoyancy of the vessel 1 causing the level of fluid in the hold to rise above the waterline slightly until such time as the outlet 9 is released to enable the outer end 11 thereof to fall below a level of the fluid within the hold 5 and the fluid in the lower portion of the hold 5 tends to flow outwardly from outlet 9 and return to the supporting body of water.

It will be appreciated that with most substantially non-water soluble products of a lower density than water, even should those substances be mixed or semi-emulsified with the water, in time the products will tend to float and separate from the water.

The size of the hold 5 is in the preferred form provided such a time between the nominal inflow and nominal outflow of the fluid from the inlet 6 to the controlled outlet 9 is established so that, there will be a sufficient separation of the relative substances for substantially predominantly water to exit from the outlet 9 or decanting tube, such as when the vessel 1 is filled with the pollutant/water mix from the hose H. It will be understood that over a period of time a concentration of the pollutant cargo within the hold 5 occurs.

In a further embodiment of the invention, the containment means 5 or hold may have a series of, or at least one, weir 20 or restriction means therein, dividing the hold 5 into separate containment areas between the inlet 6 and the outlet 9, open beneath the restriction or weir 20 to enable water to readily move to the outlet 9 yet entrap less dense pollutants.

In this way, it will be appreciated that the flow path of fluid mix from the inlet to the outlet through the containment means 5 or hold is substantially more structured and is slowed somewhat, to provide enhanced separation of the substances from the water.

Thus, a substantially convenient method and apparatus is provided for concentration of pollutants from dispersal in water, and substantially greater efficiency of recovery of pollutant materials can be achieved.

In addition to the recovery of pollutants in a more efficient manner, it will be appreciated that the apparatus also facilitates the convenient handling of the vessel or decanting and subsequent handling. An operator can monitor quality of water emanating from the decanting means or outlet 9 and when such water quality is such that it indicates that the level or concentration of pollutant material within the hold 5 is such that little water remains, it is possible for the outlet 9 or decanting tube to be raised to the upper and closed position and thereafter the vessel can be moved to a discharge area for cargo discharge.

Discharge of the cargo is achieved either by placing of submersible pumps into the hold 5 or, alternatively by passing a hose into the base of the hold through the outlet 9 to facilitate removal of the cargo from the hold 5.

While the preferred method of decanting unwanted water from the cargo area 5 is effected by gravity, an alternative or additional method of decanting unwanted water from the cargo area can also be achieved by moving the vessel 1 with a cargo load in the containment means 5 or hold, for example when the loaded vessel is moved towards the discharge area.

Because of the flexible nature of the containment means 5 or cargo area, a hydrodynamic pressure tends to develop at least against the forward portions of the containment means 5 or hold, thus tending to collapse that portion such as shown by broken lines D of FIG. 1. The deformation tends to reduce the volume of the containment means 5 or hold and raise a level of the cargo therewithin. Pressure created by the partial collapse of the containment means 5 or hold is utilised to achieve further controlled discharge of water from the cargo as the vessel 1 is underway, thus enabling further concentration of the pollutant cargo prior to discharge.

It is to be understood that one primary factor in the separation of many substantially non-water soluble contaminants when emulsified in water (such as oil) is time. It will be appreciated that the "transportation time" while the vessel 1 is underway between the spillage site and the discharge area can be effectively utilised to further reduce unnecessary handling of water which has separated from the pollutant.

It will be understood that on decommissioning of the apparatus, the vessel 1 can be raised from the water surface in a substantially convenient manner without undue strain on the vessel or lifting arrangements, and any small amount of cargo remaining within the vessel 1 can be readily drained or pumped from the hold 5 prior to or during completion of the lift through the decanting means or outlet 9.

Thus it is relatively simple for an operator to fully drain the cargo area or hold via the decanting means and also to wash, decontaminate or otherwise cleanse the apparatus after use.

Thus, by this invention there is provided a method and means of handling pollutant and other fluid materials.

Modifications may be incorporated without departing from the scope or spirit thereof as defined in the appended claims.

I claim:

1. A method of separating from water an at least partially non-water soluble substance having a density less than water, comprising the steps of:

forming a containment means and supporting said containment means on a body of water;

providing an inlet means portion for said containment means;

providing a controlled outlet for said containment means in communication with a lower portion of said containment means, said controlled outlet including an elongate hollow member positioned on an exterior of said containment means and exiting therefrom outwardly, the elongate hollow member having an outlet port thereof mounted to said containment means in a substantially flexible manner so as to be moveable relative to the containment means between a position substantially level with the lower portion of said containment means and a position substantially level with a maximum-load level of said containment means;

introducing a mixture of water and said substance into said containment means via said inlet means portion and holding said mixture in said containment means for sufficient time so at least a part of said substance separates from said water; and controlling said outlet by movement of said outlet port between said levels to achieve a controlled outflow of water from the lower portion of said containment means, to concentrate said substance in said containment means.

2. A method of separating as claimed in claim 1 further comprising the step of controlling said outlet to facilitate an outflow of at least some water from within said containment means to the body of water supporting said containment means.

3. A method of separating as claimed in claim 1 further comprising the step of controlling said outlet to restrict an outflow of said substance from within said containment means.

4. A method of separating as claimed in claim 1 further comprising the step of positioning at least one restriction means in said containment means between the inlet means portion and the outlet.

5. A method of separating as claimed in claim 1 further comprising the step of forming at least a portion of said containment means to be flexible, moving said containment means through said body of water sufficiently to deform at least a portion of said containment means to reduce a volume of said containment means and effect an at least partial fluid outflow from said outlet.

6. A method of separating as claimed in claim 1 further comprising the step of filling said containment means to a level at or above a level of the water surface of said body of water supporting said containment means.

7. A method of separating as claimed in claim 1 further comprising the step of adding floatation means to support said containment means on said body of water.

8. A vessel including a containment means for the separation of water and at least partially non-water soluble substances less dense than water, said containment means supportable by a body of water and having an inlet means portion, said containment means having a controllable outlet positioned substantially remote from said inlet portion, to enable controlled communication of at least a lower portion of said containment means with the supporting body of water, said outlet including an elongate hollow member positioned on an exterior of said containment means and exiting therefrom outwardly, said elongate hollow member having an outlet port thereof mounted to said containment means in a substantially flexible manner so as to be moveable relative to said containment means between a position substantially level with the lower portion of the containment means and a position substantially level with a maximum-load level of said containment means.

9. A vessel as claimed in claim 8 wherein the vessel includes floatation means.

10. A vessel as claimed in claim 8 wherein at least a portion of the containment means is fillable to or above a water level of the surrounding supporting body of water.

11. A vessel as claimed in claim 8 wherein at least a portion of said containment means is deformable inwardly to reduce the volume capacity of said containment means.

12. A vessel as claimed in claim 8 wherein the containment means is adapted to receive fluids therein, with at least one restriction means positioned in the said containment means between said inlet means portion and said outlet under which fluid material passing from said inlet means portion must pass prior to exiting the containment means via said outlet.

* * * * *